United States Patent [19]

Arai et al.

[11] Patent Number: 5,448,942
[45] Date of Patent: Sep. 12, 1995

[54] ENGINE PISTON

[75] Inventors: Takayuki Arai; Yoshiki Sekiya; Takaharu Goto, all of Yokohama, Japan

[73] Assignee: Nissan Motor Co., Ltd., Kanagawa, Japan

[21] Appl. No.: 202,242

[22] Filed: Feb. 25, 1994

[30] Foreign Application Priority Data

Mar. 9, 1993 [JP] Japan .................. 5-48239

[51] Int. Cl.$^6$ .............. F16J 1/04; F02F 3/00
[52] U.S. Cl. .................. 92/233; 123/193.6
[58] Field of Search ............ 92/177, 233; 123/193.6

[56] References Cited

U.S. PATENT DOCUMENTS

| 4,648,309 | 3/1987 | Schellmann | 123/193.6 X |
| 4,716,817 | 1/1988 | Ripberger et al. | 123/193.6 X |
| 4,756,241 | 7/1988 | Sakurahara et al. | 92/233 |
| 5,058,489 | 10/1991 | Iwaya | 92/233 |
| 5,076,226 | 12/1991 | Watanabe et al. | 123/193.6 |
| 5,107,807 | 4/1992 | Arai et al. | 92/233 X |
| 5,158,008 | 10/1992 | Ripberger et al. | 92/233 X |
| 5,193,436 | 3/1993 | Hamai et al. | 92/233 |

FOREIGN PATENT DOCUMENTS

| 4122921 | 1/1992 | Germany | 123/193.6 |
| 4110306 | 3/1992 | Germany | 123/193.6 |
| 3-115762 | 5/1991 | Japan . | |
| 3115762 | 5/1991 | Japan | 123/193.6 |
| 3-199655 | 8/1991 | Japan . | |
| 1615420 | 12/1990 | U.S.S.R. | 123/193.6 |

Primary Examiner—John E. Ryznic
Attorney, Agent, or Firm—Lowe, Price, LeBlanc & Becker

[57] ABSTRACT

A piston is free to slide in an engine cylinder, this piston comprising a piston head of circular cross-section, a skirt formed such that it is continuous with the lower part of said piston head, a piston pin passing through the skirt, and a connecting rod connected via this piston pin. This skirt comprises an upper part and a lower part which respectively have an elliptical horizontal cross-section with a short axis parallel to the piston pin, the horizontal cross-section of the upper part of the skirt having a higher eccentricity than that of the lower part of the skirt. The skirt further comprises a taper surface which smoothly connects its upper and lower parts. The contact surface between the skirt and the cylinder therefore has an inverted T shape so that the contact surface of the lower part of the skirt can be increased. It is therefore possible to set the distance from the center of the piston pin to the lower edge of the skirt such that it is no greater than 1.8 times the distance from the center of the piston pin to the upper edge of the skirt, so making the piston more compact while maintaining operational stability.

4 Claims, 3 Drawing Sheets

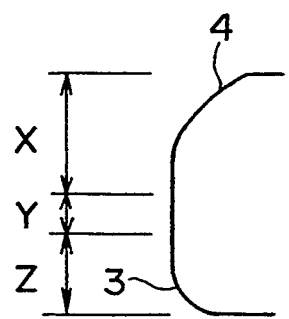
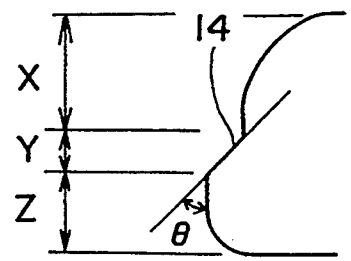
FIG. 3          FIG. 4
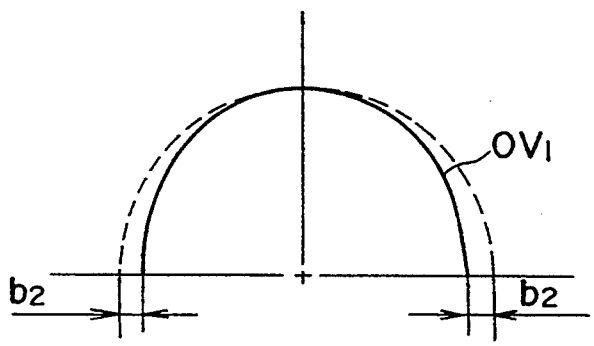
FIG. 5
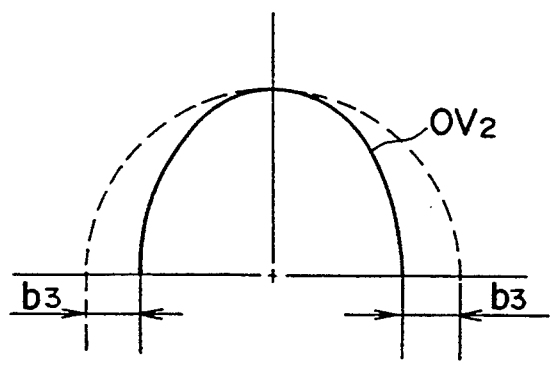
FIG. 6

ENGINE PISTON

FIELD OF THE INVENTION

This invention relates to a shape of all engine piston which executes a back and forth motion, and more specifically to the shape of a skirt which is formed continuously with a lower part of a piston head.

BACKGROUND OF THE INVENTION

A skirt is generally formed on the lower part of an engine piston which executes a back and forth motion, the piston being connected to a connecting rod via a piston pin which passes through the skirt. This skirt has the function of supporting the piston such that the latter does not lean due to the combustion energy acting upon It, and the skirt slides on the inner circumference of the cylinder.

As the skirt tends to suffer more thermal expansion in a perpendicular direction to the piston pin due to the combustion heat of the engine, it may for example be formed with all elliptical cross-section having the piston pin as its short axis and the perpendicular direction as its long axis.

Although the skirt has to support the piston, it must not cause the frictional resistance of the piston to increase. It is therefore desirable that the contact surface area between the skirt and the cylinder is small provided that the supporting force is still sufficient.

In Japanese Tokkai Hei 3-115762 and Tokkai Hei 3-199655 published by the Japanese Patent Office, pistons are described wherein the skirt has all elliptical cross-section which progressively approaches a circle towards the upper part of the skirt. As a result of this arrangement, the skirt has a T-shaped area on Its outer circumference to contact with the cylinder.

In order to render the piston more compact and lightweight, it is desirable that the part of the skirt under the piston pin is kept short. However, if the length of the skirt under the piston pin is short, the surface area of the skirt under the piston pin which is in contact with the cylinder is small, and the force acting on this contact surface due to the transverse load acting on the piston increases, which makes the piston unstable.

SUMMARY OF THE INVENTION

It is therefore an object of this invention to reduce the length of the skirt under the piston pin without affecting the stability of piston action.

To achieve this object, this invention provides a piston a piston head of circular cross-section, a skirt formed such that it is continuous with the piston head, a piston pin which passes through the skirt, and a connecting rod connected to this piston pin.

The skirt comprises an upper part and a lower part which respectively have a cross-section comprising an ellipse, the short axes of the ellipses being parallel to the piston pin. The cross section of the ellipse of the upper part has a higher eccentricity than that of the lower part. The skirt also has a taper surface which provides smooth continuity between the upper and lower parts of the skirt.

It is preferable that the distance from the center of the piston pin to the lower edge of the skirt is set to be no greater than 1.8 times the distance from the center of the piston pin to the upper edge of the skirt.

It is also preferable that the taper surface is not inclined to the vertical by more than one degree.

It is also preferable that at least one of the upper and lower parts has a cross-section comprises a plurality of ellipses.

The details as well as other features and advantages of this invention are set forth in the remainder of the specification and are shown in the accompanying drawings.

BRIEF DESCRIPTION OF THE DRAWINGS

FIG. 3 is a vertical cross-sectional view through the piston taken along a line 3—3 in FIG. 2.

FIG. 4 is a vertical cross-sectional view through the piston taken along a line 4—4 in FIG. 2.

FIG. 5 is a horizontal cross-sectional view through the piston taken along a line 5—5 in FIG. 2.

FIG. 6 is a horizontal cross-sectional view through the piston taken along a line 6—6 in FIG. 2.

DESCRIPTION OF THE PREFERRED EMBODIMENTS

Figure 1:
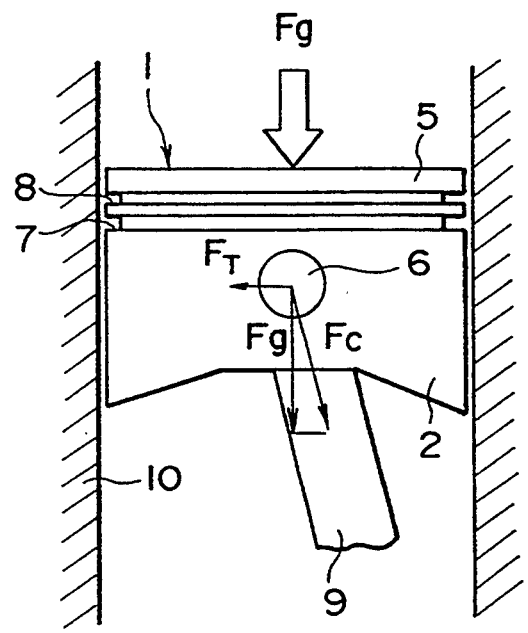
FIG. 1 is a vertical cross-sectional view of the main parts of a cylinder housing a piston according to this invention.

Referring to FIG. 1 of the drawings, a piston 1 comprises a piston head 5 having a top ring groove 8 and an oil ring groove 7, and a skirt 2 formed under the piston head 5. The skirt 2 is connected to a connecting rod 9 via a piston pin 6 which is perpendicular to the center axis of the piston 1.

The piston 1 executes a back and forth motion in a cylinder 10 due to the combustion pressure Fg of a combustion chamber formed in the cylinder 10 above the piston head 5, and thereby rotates a crankshaft situated at a lower position, not shown, which is connected via the piston pin 6 and connecting rod 9.

As the piston 1 moves from top dead center to bottom dead center, the combustion pressure Fg applies a force Fc in an axial direction to the connecting rod 9 via the piston 1. A force Ft simultaneously acts on the piston 1 in a horizontal direction according to the inclination angle of the connecting rod 9, and the piston 1 is pressed by this horizontal force Ft against the wall of the cylinder 10 on the left-hand side of the drawing. When the piston 1 rises from bottom dead center, the inertia of the crankshaft pushes the piston 1 upward via the connecting rod 9, and the piston is thereby pressed against the wall of the cylinder 10 on the right-hand side of the drawing.

Figure 2:
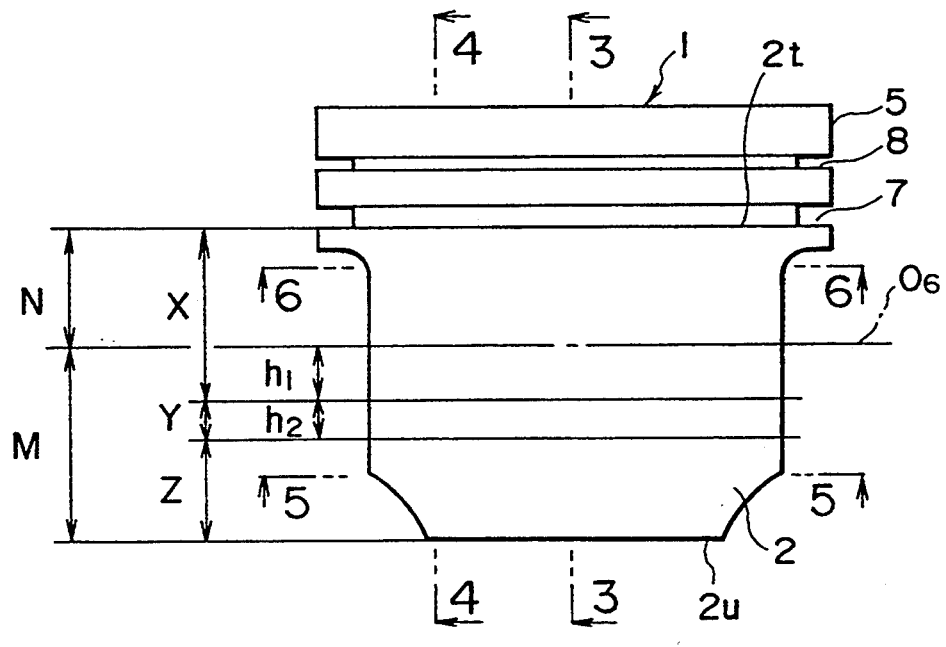
FIG. 2 is a side view of the piston according to this invention.

The shape of the skirt 2 of the piston is shown in FIG. 2. In this drawing, $O_6$ is the center line of the piston pin 6.

The distance M from the center line $O_6$ of the piston pin 6 to the lower edge of the skirt 2 is set to be no greater than 1.8 times the distance from the center line $O_6$ of the piston pin 6 to the upper edge of the skirt 2, i.e. $M \leq 1.8*N$.

As shown in FIGS. 2, 3 and 4, the skirt 2 has horizontal cross-sections which comprise ellipses $OV_1$ and $OV_2$, theses ellipses forming a barrel shape in profile such that their long diameter varies in the axial direction of the piston 1. As a result, taper parts 3 and 4 are formed in vertical cross-sections through the skirt 2 in perpendicular planes corresponding to the long axes of the ellipses.

The ellipses, i.e. $OV_1$ and $OV_2$, have different eccentricities. In the interval X extending from a point situated at $h_1$ below the center line of the piston pin 6 to the upper edge of the skirt 2, the cross-section of the skirt 2 is an ellipse $OV_2$ of relatively high eccentricity, whereas in the interval Z extending from a point situated at $h_1+h_2$ below the center line of the piston rod 9 to the lower edge of the skirt 2, the cross-section of the skirt 2 is an ellipse $OV_1$ of relatively lower eccentricity. As can be seen from FIGS. 3 and 4, the difference between the long and short diameters of the ellipse $OV_1$ is less than in the case of the ellipse $OV_2$, i.e., $b_2 < b_3$, the former ellipse being closer to a circle.

The interval X constitutes the upper part of the skirt and the interval Z constitutes the lower part of the skirt. Further, a taper surface 14 is formed in an interval Y lying between the interval X and the interval Z so as to effect a smooth translation between the upper and lower parts of the skirt 2. The inclination $\theta$ of this taper surface is set to lie within the range $\theta < 1.0$ degrees so that the skirt 2 does not cause galling on the inner wall surface of the cylinder 10.

For the sake of clarity, parts of different dimensions have been emphasized in FIGS. 3–6, although in practice the difference between $b_2$ and $b_3$ is of the order of 10 $\mu$m.

Figure 7:
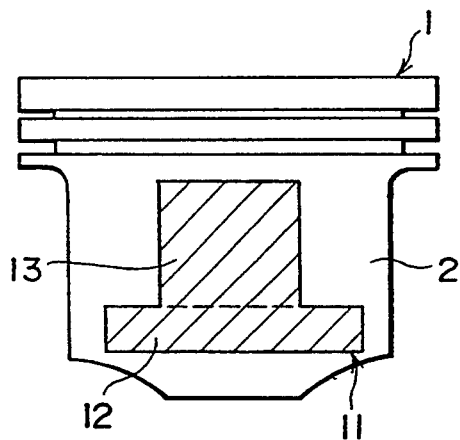
FIG. 7 is a side view of the piston according to this invention showing the contact area between the skirt and the cylinder.

According to this construction, the skirt 2 has an inverted T-shape in the contact region 11 with the cylinder 10, as shown in FIG. 7. By increasing the length of the circumference of the lower part 12 of this contact region 11, the contact surface area between the cylinder 10 and the skirt 2 below the piston pin 6 can be increased. Hence, even if the distance M from the center line $O_6$ of the piston pin to the lower edge of the skirt 2 is no greater than 1.8 times the distance N from the center line $O_6$ of the piston pin 6 to the upper edge of the skirt 2, there is no need to be concerned that the pressure acting on the skirt 2 above and below the piston pin 6 will be uneven.

In other words, the skirt 2 can be shortened while maintaining a good balance of contact surface area above and below the piston pin 6, so the piston can be made more compact and lightweight. Due to this well-balanced contact surface area, problems such as piston strap noise and galling of the piston 1 are prevented.

Alternatively, instead of balancing the contact surface areas above and below the piston pin 6 by lengthening the circumference of the lower edge 12 of the contact region 11, the length of the circumference of the upper part 13 can be shortened. In this case, the overall contact surface area is less so that frictional losses in the piston operation are reduced.

A gap of at least 25 $\mu$m with the cylinder 10 is maintained outside the contact region 11 of the skirt 2. This gap prevents break of the oil film between regions other than the contact region and the cylinder 10, and reduces friction between the skirt 2 and the cylinder 10.

Figure 8:
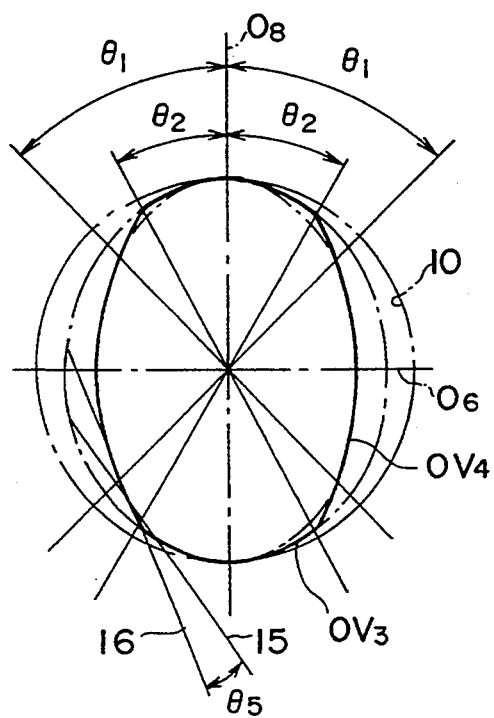
FIG. 8 is a horizontal cross-sectional view through the piston according to another embodiment of this invention, the section being taken at the same point as in FIG. 5.
Figure 9:
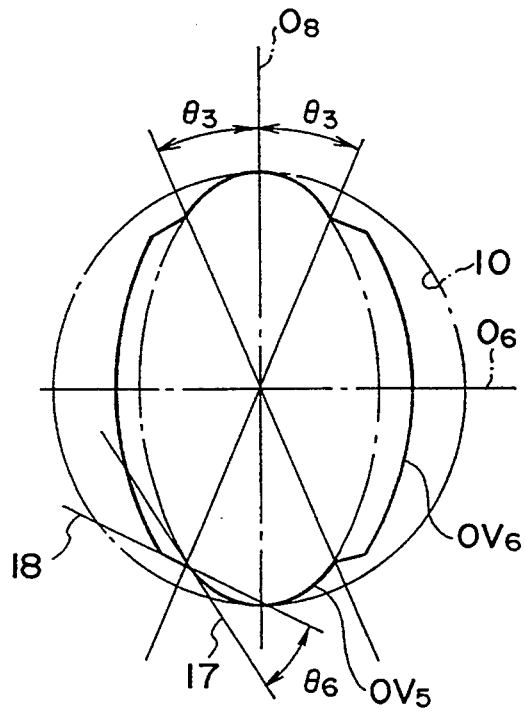
FIG. 9 is a horizontal cross-sectional view through the piston according to another embodiment of this invention, the section being taken at the same point as in FIG. 6.

FIGS. 8 and 9 show another embodiment of this invention. According to this embodiment, the cross-sections of the skirt 2 above and below the piston pin 6 are both complex shapes consisting of a plurality of ellipses. The horizontal cross-section below the center line $O_6$ of the piston pin 6, i.e. in the interval Z of FIG. 1, consists of two ellipses $OV_3$ and $OV_4$, and a straight line 16. This cross-section is the ellipse $OV_4$ which has a relatively high eccentricity excepting within an angle $\theta_1$ from a center line $O_8$, this angle including the long diameter of the ellipse, and the ellipse $OV_3$ which has a relatively low eccentricity within an angle $\theta_2$ from the center line $O_8$. The angles $\theta_1$ and $\theta_2$ are connected by the straight line 16. An angle $\theta_5$ formed by the straight line 16 and the tangent 15 to the ellipse $OV_4$ is set to lie within the range 0.3 degrees $\leq \theta_5 \leq 2$ degrees.

The horizontal cross-section above the center line $O_6$, i.e. in the interval X of FIG. 1, consists of two ellipses $OV_5$ and $OV_6$, and a straight line 18. This cross-section is the ellipse $OV_5$ which has a relatively high eccentricity within an angle $\theta_3$ from the center line $O_8$, and the ellipse $OV_6$ which has a relatively low eccentricity together with a straight line 18 which connects the two ellipses in other regions. All angle $\theta_6$ between the straight line 18 and the tangent 17 to the ellipse $OV_5$ is set to lie within the range 0.3 degrees $\leq \theta_5 \leq 2$ degrees.

Comparing the above ellipses $OV_3$–$OV_6$, $OV_5$ has a higher eccentricity than $OV_3$, and $OV_6$ has a higher eccentricity than $OV_4$. The cross-section of the skirt 2 therefore approaches a circle in proceeding from the top to the bottom. The gap between the outer circumference of the skirt 2 corresponding to the ellipses $OV_3$, $OV_5$ and the cylinder 10 when the engine is running is set to be in the range 0 to 25 $\mu$m. The gap between the outer circumference of the skirt 2 corresponding to the ellipses $OV_4$, $OV_6$ and the cylinder 10 when the engine is running is set to be larger than 25 $\mu$m. Hence, by arranging the cross-section of the skirt 2 above and below the piston pin 6 to be a complex shape combining two ellipses, the step of the skirt 2 in the boundary area between the ellipses $OV_6$ and $OV_4$ which are aligned in a vertical direction, can be reduced. The difference between the eccentricities of the ellipses $OV_5$ and $OV_3$ may also be set large. Further, by arranging $\theta_3 < \theta_2 < \theta_1$, the contact surface area between the lower part of the skirt 2 and the cylinder 10 may be increased. According to this construction, therefore, the lower part of the skirt 2 may be made even shorter while maintaining contact surface area with the cylinder 10, which permits greater freedom of design.

The embodiments of this invention in which an exclusive property or privilege is claimed are defined as follows:

1. A piston adapted to slide in an engine cylinder, having a piston head of a circular cross-section, a skirt formed below said piston head and continuous with said piston head, a piston pin passing through said skirt, and a connecting rod connected to this piston pin, characterized in that:

said skirt comprises an tipper part and a lower part which respectively have a horizontal cross-section comprising an ellipse with a short axis parallel to said piston pin, the ellipse of the horizontal cross-section of said upper part has a higher eccentricity than the ellipse of the horizontal cross-section of said lower part, said skirt further comprises a taper surface which smoothly connects said tipper and lower parts.

2. An engine piston as defined in claim 1, wherein the distance from the center of said piston pin to the lower edge of said skirt is set to be no greater than 1.8 times the distance from the center of said piston pin to the upper edge of said skirt.

3. An engine piston as defined in claim 1, wherein the inclination angle of said taper surface with respect to the vertical is set to be within one degree.

4. An engine piston as defined in claim 1, wherein at least one of said upper and lower parts has a cross-section comprising a plurality of ellipses.

* * * * *